United States Patent [19]

Nield

[11] 4,015,033
[45] Mar. 29, 1977

[54] LAMINATES OF ACRYLONITRILE/STYRENE COPOLYMERS

[75] Inventor: Eric Nield, Watton-at-Stone, England

[73] Assignee: Imperial Chemical Industries Limited, London, England

[22] Filed: Mar. 6, 1975

[21] Appl. No.: 555,834

Related U.S. Application Data

[63] Continuation of Ser. No. 330,463, Feb. 7, 1973, abandoned.

[30] Foreign Application Priority Data

Feb. 24, 1972 United Kingdom ............... 8567/72
Jan. 17, 1973 United Kingdom ............... 2397/73
Feb. 24, 1972 United Kingdom ............... 8568/72

[52] U.S. Cl. .............................. 428/35; 215/1 C; 264/98; 264/99; 264/173; 264/209; 264/241; 428/36; 428/516; 428/520; 428/522; 428/523; 526/297

[51] Int. Cl.² ......................................... B32B 27/08

[58] Field of Search .......... 428/516, 520, 522, 523, 428/36, 35; 215/1 C; 260/85.5 R; 264/98, 99, 209, 173, 241

[56] References Cited

UNITED STATES PATENTS

| | | | |
|---|---|---|---|
| 3,423,231 | 1/1969 | Lutzmann | 428/523 |
| 3,451,538 | 6/1969 | Trementozzi | 215/1 C |
| 3,453,173 | 7/1969 | Isley et al. | 428/520 |
| 3,697,368 | 10/1972 | Bhuta et al. | 428/474 |

FOREIGN PATENTS OR APPLICATIONS 663,268 12/1951 United Kingdom

*Primary Examiner*—Marion E. McCamish
*Attorney, Agent, or Firm*—Cushman, Darby & Cushman

[57] ABSTRACT

A laminate for packaging formed from at least two different thermoplastic polymers, one of which comprises a homogeneous copolymer of acrylonitrile and at least one aromatic olefine (the molar concentration of units of acrylonitrile to units of aromatic olefine being within the range 86% to 93%.

6 Claims, No Drawings

LAMINATES OF ACRYLONITRILE/STYRENE COPOLYMERS

This is a continuation of application Ser. No. 330,463 filed Feb. 7, 1973, now abandoned.

This invention relates to laminates and in particular to laminates for packaging.

Dutch patent application No. 71 15435 relates to a sealed package comprising contents partially or totally enclosed by a moulded container formed from a thermoplastic composition which comprises a homogeneous copolymer of acrylonitrile and at least one aromatic olefine, the molar concentration of units of acrylonitrile being within the range 86% to 93%, and optionally a compatible graft copolymer having a diene rubber substrate, the concentration of graft copolymer, if any, being such that the rubber content of the thermoplastic composition is not more than 50% by weight.

According to the present invention, a laminate for packaging is provided formed from at least two different thermoplastic polymers, one of which comprises a homogeneous copolymer of acrylonitrile and at least one aromatic olefine (the molar concentration of units of acrylonitrile being within the range 86% to 93% and preferably within the range of 86% to 90%).

The homogeneous copolymer may contain additives such as heat stabilisers (for example those described in Dutch patent application 70 17354), processing aids (for example those described in Dutch patent application 71 02033 and German Offenlegungsschrift 2108557), fillers and pigments. As described in Dutch patent application 71 15435 the homogeneous copolymer may, if desired, be blended with a compatible graft copolymer having diene rubber substrate, the rubber content of the resulting blend being less than 50% by weight, preferably between 5 and 15% by weight.

The laminate of the invention may be in the form of a film for tubular containers and may be made by simultaneous blow-extrusion of two or more polymers to form a tube having discrete layers of the different polymers. Alternatively the tube may be made by extrusion coating a preformed tube of another polymer followed by blowing of the so-formed laminated tube. The tube may then be cut into lengths and at least one end sealed before filling by heat seal or by ligature or by the method described in Dutch patent application 71 09161 the type of seal depending inter alia on the pressure exerted by the contents. Both ends may be sealed before filling if the tube is further provided with a filling aperture which can be sealed after filling. Alternatively the tube may be formed by sealing together the edges of two superimposed film laminates although this method is not preferred if the package is to contain material at superatmospheric pressure (e.g. gas containing liquids such as carbonated drinks) since the seals tend to fail under the peeling forces unless the package itself fails first by stretching or bursting. Where the laminate of the invention is a film in the form of a tubular container, a close fitting sleeve or casing or another material may be provided. The sleeve or casing may provide decoration, labelling, and/or reinforcing to increase the bursting strength of the tubular container. Tear tapes may be provided for opening the container, if desired. The tubular container may be placed in a free-standing support to be opened, or a free-standing sleeve, for example of cardboard, may be provided as a part of the tubular container package. Such a tubular container is also attractive in appearance and handling.

The laminate may also be prepared by lamination of preformed film for example that formed by calendering or blow-extrusion.

The laminate of the invention may be in the form of a thick-walled tube suitable for blowing moulded containers e.g. bottles by a cold or cooled parison process. The laminated thick-walled tube may be made by extrusion coating a polymer onto a preformed extruded tube of another polymer or it may be made by simultaneous extrusion of two or more polymers so as to form a tube having walls composed of discrete layers of the different polymers. Simultaneous extrusion is preferred because physical bonding between the discrete layers is generally better so reducing any tendency to delaminate although adhesion between layers might be improved by priming of a preformed inner tube. However simultaneous extrusion is usually only satisfactory when the polymers to be coextruded have broadly similar melt characteristics.

Because the laminates of the invention have discrete layers, there may be a tendency to delaminate. If the laminate is a thick-walled tube, coextrusion is a preferred method of manufacture because physical bonding between the layers is generally better than extruding onto a preformed inner tube. However simultaneous extrusion is usually only satisfactory when the polymers to be extruded have similar melt characteristics. Lamination may be improved by priming a preformed inner tube. An alternative method of improving interlayer adhesion is to apply adhesive to the contacting surfaces of the laminate or to modify the surfaces before mating the surfaces for example by treating the surfaces with a reactive gas e.g. ozone.

Moulded containers for packaging applications are generally fabricated from plastics materials by blow-moulding techniques. This process comprises three well-defined stages: firstly the production of a tubular parison; secondly, positioning of the parison in the mould; thirdly, introducing air or other fluid medium into the parison so as to blow the parison into the shape of the mould interior, with concurrent cooling of the mould and moulding. Further steps include forming a neck on the container and removal of the container from the mould. If the parison is a tube then a closed seal will be required to be formed at the end not used for introduction of blowing fluid. In the cold parison process the parison is preformed in tubular profile of required length in a normal extrusion process and allowed to cool before subsequently moulding (cold-parison process). A moulding having oriented walls is formed if moulding is carried out at a temperature below the softening point of either or both of the polymers of the laminate.

The thickness of the layer consisting of the homogeneous acrylonitrile-aromatic olefine copolymer should be between 1% and 50% of the total wall thickness (preferably between 5 and 15%) and the copolymer may be either the exterior or interior layer. In one aspect of the invention both layers of the laminate are formed from the homogeneous polymer, the layers containing different additives; for example different pigments so as to provide decoration or visual identification of the contents from appearance of the container or a weather resistant outer layer (filled with carbon black or containing extra high-cost stabiliser).

The choice of polymer will depend on the particular property or compromise of properties required for the laminate. For example, the homogeneous acrylonitrile aromatic olefine copolymer has very low permeability to carbon dioxide and oxygen and the permeability of water vapour may be decreased by laminating with polyethylene especially high density. The cost of the laminate may be reduced by laminating with PVC or a polyolefin.

Suitable polymers for coextruding with the homogeneous acrylonitrile-styrene copolymers include thermoplastic polyolefines and olefine copolymers such as for example polyethylene, polypropylene, poly(4-methyl pentene-1), polyvinyl chloride and copolymers with for example vinyl acetate, polyacrylates and polyalkylacrylates, styrene-acrylonitrile copolymers and acrylonitrile-butadiene-styrene copolymers and polystyrenes.

Also suitable are thermoplastic condensation polymers such as aliphatic polyamides (generally known as "nylons"), polyacetals, polyesters, aromatic polycarbonates, aromatic polyethers, aromatic polyketones and aromatic polysulphones, and also cellulosics. Preferred polymers are polyethylene, polypropylene and poly(vinyl chloride) [PVC].

The laminates of the invention are useful for protecting material such as foodstuffs and medicines from oxygen, and from loss of carbon dioxide and if laminated with for example polyethylene from loss of water or attack by water. Films, and vacuum formed and moulded containers from the laminates are therefore useful for packaging beverages such as wine and carbonated drinks, processed and fresh meat including bacon and ham, cream products such as for example yoghurt, cream cheese, cream, butter, margarine, and also for packaging fresh fruit and fresh fruit juices and preserves such as for example jam and marmalade. They may be used for packaging other oxygen sensitive materials such as for example paint and putty. Containers moulded from the laminates may also be used for packaging the above goods as appropriate.

An inherent problem associated with fabricating laminates is that of utility of scrap material formed for example as a sprue or flashing. In the present invention such scrap material (for example PVC/homogeneous copolymer) may be used either alone or blended with further polymer (for example, PVC) for the layer of tube onto which homogeneous copolymer is laminated. We have found for example that the physical and permeability properties of a PVC/homogeneous copolymer blend vary approximately linearly with the relative with the relative concentration of the polymers in the blend. Also if the refractive indices of the polymer and homogeneous copolymer differ by less than 0.005, then the blend will usually be transparent. The scrap material may also be used for other purposes such as for example, those associated with the laminate e.g. caps, cap liners, crates, boxes and sleeves.

The invention is illustrated by the following example.

A graft copolymer was prepared by a method similar to that described in Example 4 of British Specification 1 185 306 by copolymerising acrylonitrile and styrene in the presence of a preformed diene rubber latex. The diene rubber latex contained 20.5% solids and the diene rubber made from butadiene (88% molar) and styrene (12% molar). A graft copolymer, having a superstrate containing randomly copolymerised acrylonitrile (87.5% molar) and styrene (12.5% molar) was made from an initial charge consisting of the above diene rubber latex (12.65 kg), styrene (33.5 g), acrylonitrile (2.61 kg). The procedure of Example 4 of British Specification 1 185 306 was followed, but using dextrose (77 g); cumene hydroperoxide (56 g); ferrous sulphate (3.8 g); sodium pyrophosphate (19 g). The rate of polymerisation was followed by calorimetry and styrene was fed to the reaction mixture so that the ratio of acrylonitrile to styrene in the mixture maintained its initial value. A solution of "Nansa" HS 85/S (Marchon Ltd. Trade Mark, a high active biodegradable sodium alkyl benzene sulphonate containing 85% ± 3% of active matter) (25 g in 200 cm$^3$ of water) was fed to the reaction mixture during the reaction. The reaction was terminated by adding 2,6-ditertiary-butyl-4-methyl phenol (259 g as 30% dispersion in water). The latex of the resulting graft copolymer contained 25.5% solids representing a conversion on solids of 91%; the rubber content of the graft was 48%.

The above graft copolymer was latex blended with an acrylonitrile-styrene resin made by the method described in British Specification 1 185 305 but containing 87.5% molar acrylonitrile (blend reduced viscosity of 0.6 as measured at 25° C on a solution of the polymer in dimethyl formamide containing 0.5 g of polymer in 100 cm$^3$ of solution) to give a blend containing 12% by weight of rubber. The latices were coagulated using aqueous magnesium sulphate (1% w/v), the coagulate being filtered, washed with water and dried in a vacuum oven at 70° C.

Tubular film was made by simultaneous blow-coextrusion of the above acrylonitrile polymer blend with polyethylene ("Alkathene" XDG33, Imperial Chemical Industries Limited, a solid polymer of ethylene prepared by subjecting ethylene to extremely high pressures under carefully controlled conditions of temperature) having a melt flow index of 0.3 g/10 minutes (as measured according to British Standard 2782: Part 1/105C/1956) using a die temperature of 190° C. The films were laminated by chemically activating mating surfaces using ozone. Polyethylene formed the inner layer of the laminated tubular film. The acrylonitrile polymer layer had thickness 70 to 90 gauge (18 to 23 $\mu$m) and the polyethylene layer had thickness 108 to 154 gauge (27 to 40 $\mu$m).

The laminated film had the following properties:

|  |  | Machine Direction | Transverse Direction |
|---|---|---|---|
| Yield stress | (psi) | 4.2 × 10$^3$ | 3.5 × 10$^3$ |
|  | (MN/m$^2$) | 29.1 | 24.1 |
| Break stress | (psi) | 5.1 × 10$^3$ | 3.3 × 10$^3$ |
|  | (MN/m$^2$ | 35.1 | 22.7 |
| Elongation (%) |  | 122 | 107 |
| 1% secant modulus | (psi) | 1.3 × 10$^5$ | 1.5 × 10$^5$ |
|  | (MN/m$^2$) | 895 | 1030 |
| Elmendorff tear strength (g.cm cm$^{-1}$ × 10$^{-3}$) |  | 19 | 21 |

The open-ends of samples of the tubular film were capable of being heat-sealed to form a package. Bacon was vacuum packaged in the tubular films.

Yield stress, break stress and elongation were measured on specimens of the film which were 2 cm long, 1 cm wide and 60 $\mu$m thick using an "Instron" tensometer having a grip separation rate of 2 cm/minute. The 1% secant modulus was measured on film specimens which were 10 cm long, 1 cm wide and 60 $\mu$m thick using an "Instron" tensometer having a grip separation rate of 1 cm/minute. Elmendorff tear strength was measured according to ASTM D1922-67.

I claim:

1. A process for making a thick-walled laminated tube for blow-forming into a laminated moulded container which comprises the step of simultaneously melt extruding
   i. a thermoplastic polymer comprising a homogeneous copolymer of acrylonitrile in a molar unit concentration of from 86% to 90% and styrene, with
   ii. another thermoplastic polymer, so as to produce a laminated moulded container said polymers being melt-extruded into a tubular laminate suitable for blow-forming into a laminated moulded container.

2. A process according to claim 1 in which the homogeneous copolymer is used as a blend with a compatible graft copolymer having a diene rubber substrate, the rubber content of the blend being less than 50% by weight.

3. A process according to claim 2 in which the rubber content of the blend used is between 5 and 15% by weight.

4. A process according to claim 1 in which one of the polymers melt-extruded is polyethylene.

5. A package when formed from a laminate made by a process according to claim 1.

6. A simultaneous melt-extruded laminate for packaging comprising at least two different thermoplastic polymers, one of which comprises a homogeneous copolymer of acrylonitrile and styrene the molar concentration of units of acrylonitrile being within the range 86% to 93%.

* * * * *